United States Patent [19]

Matsumura et al.

[11] 4,354,191
[45] Oct. 12, 1982

[54] GROUND-SPEED DOPPLER RADAR FOR VEHICLES

[75] Inventors: Akira Matsumura, Yokosuka; Yoichi Kaneko, Tokorozawa; Kenji Sekine, Hinode; Akira Endo, Katsuta, all of Japan

[73] Assignees: Nissan Motor Co., Ltd., Kanagawa; Hitachi, Ltd., Tokyo, both of Japan

[21] Appl. No.: 168,158

[22] Filed: Jul. 14, 1980

[30] Foreign Application Priority Data

Jul. 27, 1979 [JP] Japan .................................. 54-94882

[51] Int. Cl.³ ............................................ G01S 13/58
[52] U.S. Cl. ......................................... 343/7.5; 343/8
[58] Field of Search ..................................... 343/7.5, 8

[56] References Cited

U.S. PATENT DOCUMENTS

| | | | |
|---|---|---|---|
| 3,118,140 | 1/1964 | Vladimir et al. | 343/8 |
| 3,713,151 | 1/1973 | Kofsky | 343/8 X |
| 3,992,709 | 11/1976 | Wantanabe et al. | 343/7.5 |

Primary Examiner—T. H. Tubbesing
Attorney, Agent, or Firm—Antonelli, Terry & Wands

[57] ABSTRACT

A Doppler radar wherein, in order to measure the ground speed of an automobile, microwaves are radiated to the ground and the Doppler shift of reflected waves from the ground is detected, characterized in that to the end of avoiding a malfunction ascribable to an external microwave interference, when the differentiated output of the Doppler radar is greater than a threshold value, the frequency of the microwaves of the Doppler radar is controlled so as to prevent the microwave interference from taking place.

12 Claims, 5 Drawing Figures

GROUND-SPEED DOPPLER RADAR FOR VEHICLES

BACKGROUND OF THE INVENTION (1) Field of the Invention

This invention relates to a ground-speed Doppler radar for vehicles which is carried on vehicles such as automobiles and used for detecting the ground speed thereof.

(2) Description of the Prior Art

For the anti-skid braking system of an automobile and other speed controls thereof, it is necessary to precisely and quickly measure the speed of the automobile relative to the ground. As means for measuring the ground speed of the automobile, apparatus is known wherein a microwave Doppler radar is carried on the automobile and the frequency shift or Doppler effect between waves radiated from the antenna of the radar towards the ground and waves reflected from the ground to the antenna is utilized to measure the ground speed of the automobile.

In such ground-speed Doppler radar, microwave signal interference must be prevented from occurring between the waves mentioned above and waves generated from a transceiver carried on an automobile, a high-power wireless equipment situated near the road, or the like.

Experiments have revealed that the interference between the waves of two Doppler radars for measuring the speeds of automobiles takes place only when the difference in transmission frequencies approaches about 10 kHz, and when the waves are identical in the direction of radiation (leakage) and sufficiently high in power. Therefore, the probability of such interference is low.

However, in the case where a high reliability is required, the influence of the microwave signal interference on the accurate detection of speed is not negligible. Further, when the existence of more powerful disturbing waves is considered, effective means for eliminating the microwave signal interference becomes necessary.

SUMMARY OF THE INVENTION

It is accordingly an object of this invention to realize a Doppler radar utilizing microwaves which is not affected by microwave signal interference ascribable to waves from another wave source and which has a high reliability.

In order to accomplish this object, the present invention is so constructed that a detector circuit for detecting the presence or absence of microwave signal interference is disposed so that when the microwave signal interference is found to occur on the basis of the output of the detector circuit, the frequency of transmission waves is changed-over to a frequency which does not give rise to the microwave signal interference, whereby the influence of the interference on the system is eliminated. The invention is especially characterized in that the detector circuit detects the existence of the microwave signal interference, depending upon whether or not the variation of a vehicular speed signal per unit time exceeds a fixed value.

More specifically, since the variation of the vehicular speed signal per unit time represents the acceleration of an automobile, the fixed value may be set at a value representing an acceleration of the automobile which cannot occur, i.e., within a range of 0.5–1.5 G (acceleration of gravity) [4.9 m/s² – 14.7 m/s²]. According to the Doppler radar of this invention, undesirable interference waves and necessary reflected waves can be readily discerned by utilizing a differentiation circuit and a threshold circuit to detect excessive acceleration values in the prior-art Doppler radar system, and the influence of the interference waves can be readily avoided by controlling the frequency of the oscillator which generates and radiates waves towards the ground on the basis of the output of the threshold circuit.

The above-stated and other objects and features of this invention will become more apparent from the following description of embodiments taken with reference to the drawings.

DESCRIPTION OF THE PREFERRED EMBODIMENTS

Figure 1:
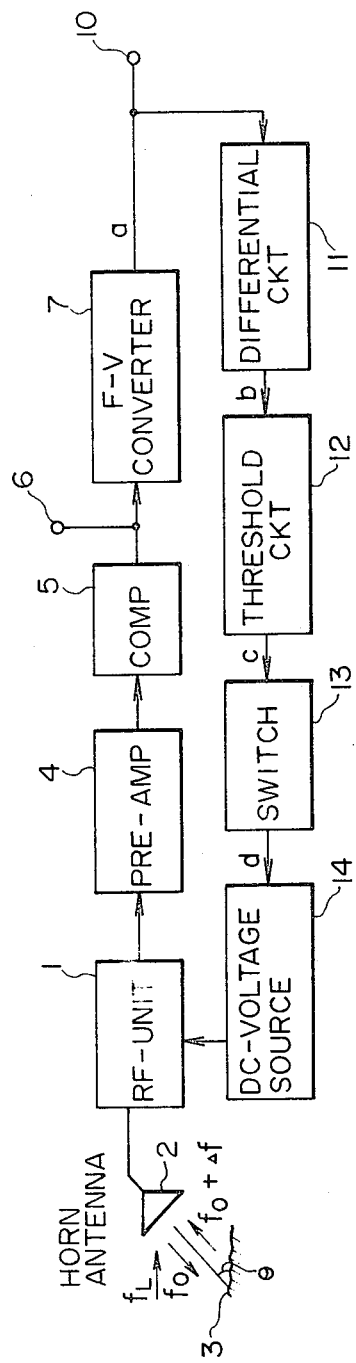
FIG. 1 is a block diagram showing the construction of an embodiment of a Doppler radar according to this invention.

FIG. 1 is a block diagram which shows the construction of an embodiment of a Doppler radar according to this invention.

In the figure, numeral 1 designates an R.F. unit which includes an oscillator and a mixer circuit. Transmission microwaves from the oscillator are emitted at a fixed angle $\theta$ towards a road surface 3 through a horn antenna 2. The emitted microwaves (continuous waves at a frequency $f_O$) are scattered and reflected by the road surface 3 and undergo a Doppler shift (the shift frequency being denoted by $\Delta f$) in dependence on the relative velocity between the automobile and the road surface 3, which acts as a reflector body, whereupon the microwaves are received by the horn antenna 2 again as reflected waves. The reflected waves are applied to the mixer circuit of the R.F. unit 1, and are converted into the signal $\Delta f$ (hereinbelow, called the "Doppler signal") corresponding to the frequency component of the received signal which is subjected to the Doppler shift. Here, letting the vehicular speed be V [m/s] and the wavelength be $\lambda$[m], they are related with the Doppler shift frequency $\Delta f$ [Hz] as follows:

$$\Delta f = (2 \ V/\lambda) \cos \theta$$

The doppler signal which falls only in a frequency region corresponding to possible vehicular speeds is amplified by a pre-amplifier 4, and the amplified signal is applied to a comparator 5. The comparator 5 converts the input signal into a pulse signal of fixed amplitude with an interval representative of the frequency of the input signal, and accordingly supplies the information V [m/s] of the vehicular speed. Therefore, a pulse vehicular-speed signal can be derived from a terminal 6. The pulse signal is also applied to a frequency-voltage converter 7, and is converted into a signal having a voltage value proportional to the speed by means of a circuit which varies its output level in dependence on the pulse interval. The converted signal is provided from a teminal 10. The frequency-voltage converter has also the function of a smoothing circuit which suppresses an abrupt change attributed to the lack of a pulse.

The portion above described corresponds to the principle construction of the Doppler radar which has hitherto been known.

Figure 2:
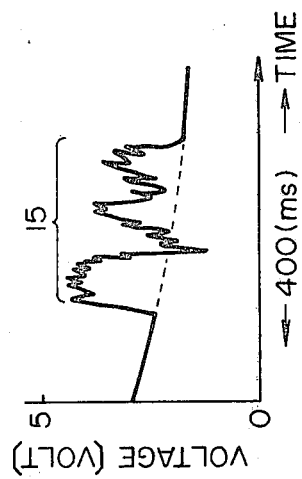
FIG. 2 is a diagram for explaining an output waveform attributed to a disturbance.

In the above construction, in the case where a signal consisting of interference waves (at a frequency $f_L$) approximate to the frequency $f_O + \Delta f$ of the reflected waves has been applied as stated before, the output voltage from the output terminal 10 undergoes an abruptly changing part 15 due to the component of the external disturbing frequency $f_L$ as illustrated in FIG. 2 in spite of the fact that the vehicular speed is not abruptly changing.

To the end of eliminating the influence of the component of the external frequency signal $f_L$, the present embodiment is constructed as described below. In order to discern that the part 15 is not information relating to the vehicular speed, but is a disturbance signal it is determined, whether or not the output signal of the frequency-voltage converter 7 is a signal based on a practically attainable vehicular acceleration by determining whether or not the acceleration exceeds 1 G (i. e., 9.8 m/s$^2$). Thus, when the acceleration is in excess of 1 G, the bias voltage of the oscillator of the R.F. unit 1 is controlled so as to change the frequency of the transmission microwaves.

First, the output a of the frequency-voltage converter 7 is applied to a differentiation circuit 11 and is converted into a signal b representative of the variation of the voltage per unit time, that is, a signal representative of the acceleration of the automobile.

This output of the differentiation circuit 11 is applied to a comparator circuit or threshold circuit 12, which generates a driving output signal c of high potential when its input is higher in potential than its threshold value. This threshold value is set at a magnitude which can never arise as a practical matter in terms of the acceleration of the vehicle. However, when it is set at an excessively large value, the capability of detecting the disturbance lowers, whereas when it is set at an excessively small value, the detecting sensitivity becomes excessively high and results in malfunctions. The threshold value is therefore set in relation to the range of the speeds of the object to-be-measured and the signal levels of other circuits. In the present embodiment, it is set at a voltage which is generated when the acceleration is 9.8 m/s$^2$.

A switching circuit 13 is driven by the output of the threshold circuit 12. That is, when the output of the differentiation circuit 11 is greater than the fixed threshold value, the switching circuit 13 is changed-over. By the change-over of the switching circuit 13, a D.C. voltage source 14 is controlled to change-over the voltage value of the D.C. bias determining the frequency of the oscillator of the R.F. unit and to change-over the frequency $f_O$ of the transmission microwaves to a frequency sufficiently differing from the frequency $f_L$ of the disturbance to eliminate such disturbance.

Figure 3:
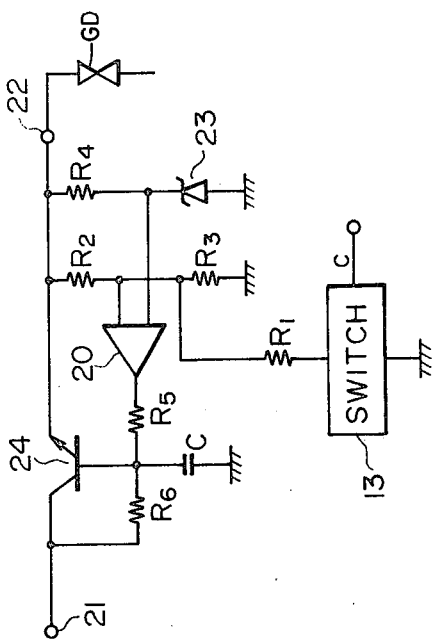
FIG. 3 is a circuit diagram of an embodiment of a D.C. voltage source control circuit in the embodiment of FIG. 1.

FIG. 3 shows a circuit diagram of an embodiment of a portion of the system including the switch 13 and the D.C. voltage source 14. The operation of the present circuit will be explained with reference to a waveform diagram in FIG. 4.

Figure 4:
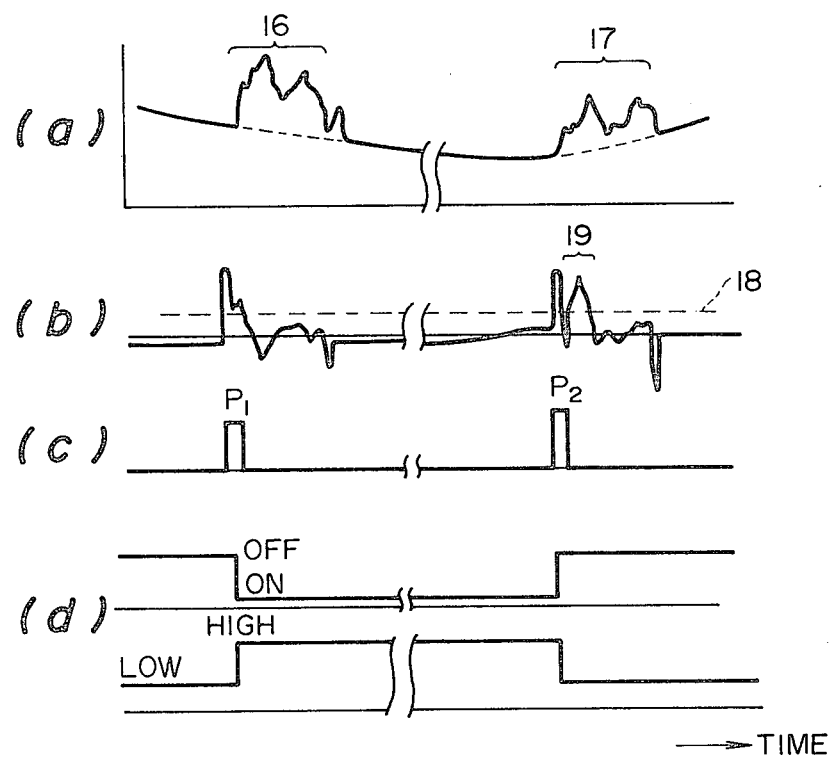
FIG. 4 is a waveform diagram for explaining the operation of the embodiment.

Now, when an output waveform at the output terminal 10 in FIG. 1 has changed as shown in (a) of FIG. 4, parts 16 and 17 are not outputs based on the vehicular speed but are outputs attributed to the disturbance. The differentiated waveform of the above output waveform becomes as shown in (b), and when the threshold value of the threshold circuit 12 is indicated by a dotted line 18, the output thereof becomes as shown in (c). As will be understood from the description of an embodiment referred to later, the part of a region 19 does not actually appear as an output because the operation of this invention is conducted.

The output c of the threshold circuit is applied to the switching circuit 13. This switching circuit is constructed of a so-called toggle switch whose polarity is inverted each time a pulse is applied. Accordingly, when pulses $P_1$ and $P_2$ of the signal (c) are applied, a voltage which is applied to a differential amplifier 20 from a voltage divider composed of resistors $R_1$, $R_2$ and $R_3$ varies as shown in (d). A terminal 21 has a D.C. voltage source connected thereto, and a terminal 22 is connected to a Gunn diode GD. The other input of the differential amplifier 20 receives a reference voltage from a voltage divider composed of a resistor $R_4$ and a Zener diode 23. The output of the differential amplifier drives the base potential of a transistor 24 through resistors $R_5$ and $R_6$, to control a bias D.C. voltage which is applied to the oscillator device at the terminal 22. By way of example, the toggle switch is turned from "OFF" to "ON" by the pulse $P_1$ of the signal (c) in case of the disturbance. Thus, the bias D.C. voltage changes from "LOW" to "HIGH" so as to change the oscillation frequency $f_O$. This frequency becomes a frequency $f_O'$ spaced from the disturbing frequency $f_L$ beyond a fixed value, and the output of the part 16 in (a) is prevented from appearing. If a disturbing frequency has occurred in the vicinity of $f_L + (f_O \sim f_O')$, an output voltage which cannot exist in actuality will appear as in the part 17 of the signal (a) again. In this case, the pulse $P_2$ in (c) is generated by the same principle as in the foregoing. At this time, the toggle switch 13 changes from "ON" to "OFF," to change the voltage of the output terminal 22 from "HIGH" to "LOW" and to restore the radar to its state before the entry of the pulse $P_1$.

Figure 5:
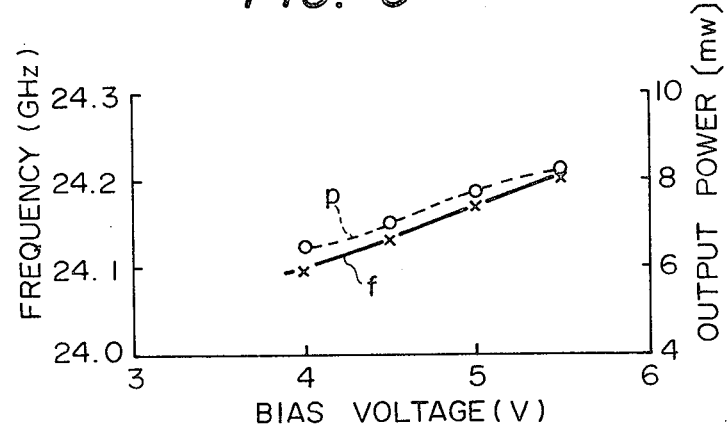
FIG. 5 is an output characteristic diagram of a Gunn oscillator device used in the embodiment.

FIG. 5 illustrates the actual measurements of variations in the output power and the oscillation frequency at the time when the bias voltage of the Gunn diode used in the above embodiment was varied. As apparent from the figure, the frequency change versus the D.C. bias voltage is 70 MHz per volt. To the end of changing the frequency of the transmission microwaves 1 MHz in order to avoid the interference, the bias voltage may be changed as slightly as 15 mV.

The Gunn diode oscillator device is effective for the miniaturization and economization of the apparatus. Especially, it is effective in case where miniaturization and vibration-proof characteristics of the apparatus are required as in the Doppler radar to be carried on vehicles. Of course, the oscillator circuit may well be provided with a variable capacitance device (varactor diode) so as to vary the bias voltage thereof.

As set forth above, in the Doppler radar according to this invention, the output variation ascribable to the disturbance is detected by a simple device, and the frequency of the transmission microwaves is changed, whereby the influence of the disturbance is eliminated, and influences between the Doppler radars carried on vehicles and ascribable to other various external waves are eliminated. In particular, means effective for a speed control system and an anti-skid control system of which exactitude is expected from the viewpoint of safety is provided.

It is to be understood that the present invention is not restricted to the foregoing embodiments but that it can be variously altered within the scope of the technical idea as defined in the appended claims.

We claim:

1. In a Doppler radar system wherein the speed of an object is detected from a frequency shift of microwaves emitted from an antenna carried by the object and reflected from a stationary surface; the improvement comprising a detecting circuit which detects a differential factor of the frequency shift, a threshold circuit which discriminates whether or not the output of said detecting circuit lies within a certain range of values, and a control circuit which varies the frequency of the microwaves emitted from the antenna on the basis of an output of said threshold circuit indicating that the output of said detecting circuit lies within said certain range of values.

2. A Doppler radar according to claim 1, wherein said detecting circuit is a differentiation circuit.

3. A Doppler radar according to claim 1, wherein said threshold circuit comprises means for discriminating whether said certain range of values comprise only values of acceleration of said object which may not actually arise as the speed of said object is measured.

4. A Doppler radar according to claim 3, wherein said threshold circuit comprises means for discriminating whether said certain range of values falls in a range of 0.5–1.5 G in terms of acceleration, where G is the acceleration of gravity.

5. A Doppler radar according to claim 1, wherein a generation source of the microwaves is constructed of a Gunn diode oscillator device, a bias voltage of which is varied by said control circuit.

6. In a Doppler radar system for detecting the speed of an object from a detected Doppler signal, the improvement comprising a differential circuit connected to receive said Doppler signal for producing an output representative of the rate of change of said Doppler signal, a threshold circuit connected to receive the output of said differential circuit for producing a control signal when the rate of change of said Doppler signal exceeds a predetermined value, and control means responsive to said control signal for adjusting an operating characteristic of said Doppler radar system.

7. A Doppler radar system according to claim 6, further including microwave signal transmission means responsive to said control signal for selectively transmitting microwave signals at first or second frequencies, and wherein said control means includes switch means responsive to said control signal for controlling said microwave signal transmission means for switching between said first and second frequencies.

8. A Doppler radar system for detecting the speed of an object comprising microwave transmission means for transmitting a microwave signal at a selected frequency; signal reception means for receiving a reflected microwave signal and for producing a Doppler signal representing the speed of the object by comparing said transmitted microwave signal and said received reflected microwave signal; differentiating means for detecting the rate of change of said Doppler signal indicating the acceleration of the object and for producing an output representative thereof; threshold means for producing a control signal when the output of said differentiating means indicates a value of acceleration which the object is incapable of achieving, and control means responsive to said control signal produced by said threshold means for changing the frequency of the microwave signal transmitted by said microwave transmission means.

9. A Doppler radar system according to claim 8, wherein said threshold means comprises means for producing said control signal when the output of said differentiating means exceeds a predetermined threshold value.

10. A Doppler radar system according to claim 8, wherein said threshold means comprises means for producing said control signal when the output of said differentiating means exceeds a predetermined threshold value which falls within a range of values corresponding to accelerations of 0.5 to 1.5 G, where G is the acceleration of gravity.

11. A Doppler radar system according to claim 8, wherein said microwave transmission means includes a Gunn diode oscillator.

12. A Doppler radar system according to claim 8, wherein said control means includes switching means for switching the frequency of the microwave signal transmitted by said microwave transmission means back and forth between first and second frequencies in response to receipt of successive control signals from said threshold means.

* * * * *